(12) United States Patent
Phillips

(10) Patent No.: US 10,979,777 B2
(45) Date of Patent: Apr. 13, 2021

(54) PROCESSING SYSTEM FOR PERFORMING REVERSE VIDEO CONTENT OUTPUT GENERATION

(71) Applicant: Honeywell International Inc., Morris Plains, NJ (US)

(72) Inventor: Mark Phillips, Sammamish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 284 days.

(21) Appl. No.: 16/240,916

(22) Filed: Jan. 7, 2019

(65) Prior Publication Data
US 2020/0221187 A1    Jul. 9, 2020

(51) Int. Cl.
| | |
|---|---|
| *H04N 21/658* | (2011.01) |
| *H04N 21/6587* | (2011.01) |
| *G06F 16/71* | (2019.01) |
| *H04N 21/432* | (2011.01) |
| *H04N 21/2387* | (2011.01) |
| *H04N 21/472* | (2011.01) |
| *G06F 16/74* | (2019.01) |

(52) U.S. Cl.
CPC ......... *H04N 21/6587* (2013.01); *G06F 16/71* (2019.01); *G06F 16/743* (2019.01); *H04N 21/2387* (2013.01); *H04N 21/4325* (2013.01); *H04N 21/47217* (2013.01)

(58) Field of Classification Search
CPC .......... H04N 21/6587; H04N 21/4325; H04N 21/2387; H04N 21/47217; G06F 16/71; G06F 16/743
See application file for complete search history.

(56) References Cited

PUBLICATIONS

"TeachEngineering" YouTube account, "Reverse Engineering Project Disassemble, Sketch, Recap", Oct. 22, 2018, YouTube.com (https://www.youtube.com/watch?v=Y0h6eGrwVKQ) (Year: 2018).*

* cited by examiner

*Primary Examiner* — Nicholas T Corbo
(74) *Attorney, Agent, or Firm* — Jetter & Associates, P.A.; Neil R. Jetter

(57) ABSTRACT

Aspects of the disclosure relate to processing systems that generate reverse video content output streams for reconstruction of sensor devices. A computing platform may receive video content including step completion inputs. Based on the step completion inputs, the computing platform may mark data packets in the video content, and may use the marked data packets to generate video segments. The computing platform may refine the video segments to remove the step completion inputs, and may generate a first reverse video content output stream using the refined video segments. The computing platform may send the first reverse video content output stream to an enhanced reality device for display. The computing platform may determine a maintenance update corresponding to a sensor device shown in the video content, and may send commands directing a maintenance database to update a maintenance log and to cause the sensor device to perform a setting adjustment.

20 Claims, 13 Drawing Sheets

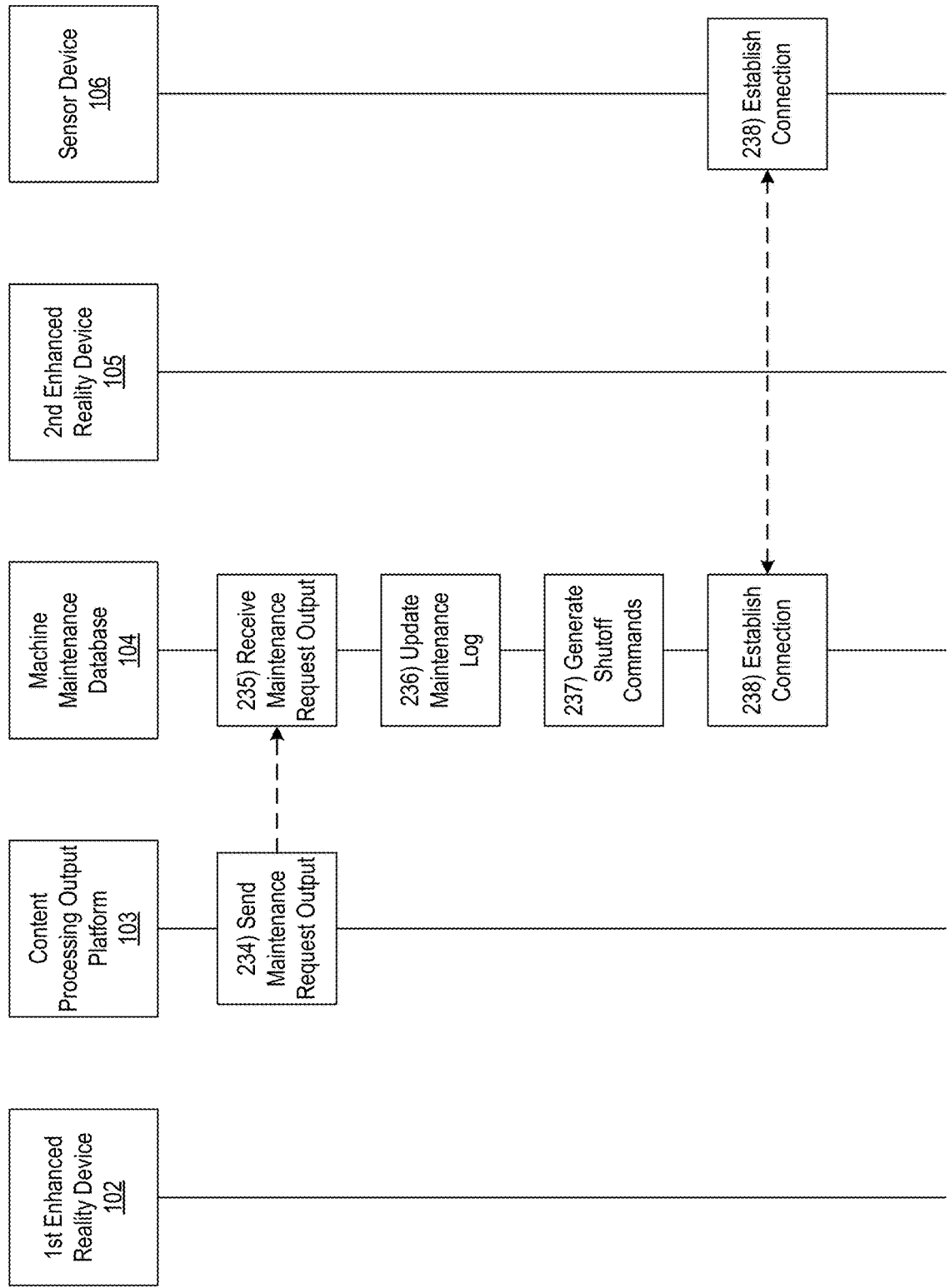

PROCESSING SYSTEM FOR PERFORMING REVERSE VIDEO CONTENT OUTPUT GENERATION

FIELD

Aspects of the disclosure relate to enhanced processing systems for performing reverse video content output generation. In particular, one or more aspects of the disclosure relate to computing platforms that generate reverse video content output streams and maintenance request outputs to improve efficiency of reversible procedure video production and to automate the processes of maintenance log updates and sensor device setting adjustment.

BACKGROUND

Many organizations and individuals rely on video content as a tool to gain valuable knowledge and experience when interacting with sensor devices with which they are unfamiliar. To conserve resources, it may be important to utilize video captured during deconstruction of the sensor devices for assembly instruction. In many instances, however, such video must be constantly rewound and played back in an attempt to discern the steps for assembly. There remains an ever present need to improve the process of video generation for reversible procedures.

SUMMARY

Aspects of the disclosure provide effective, efficient, scalable, and convenient technical solutions that address and overcome the technical problems associated with generating video content for reversible procedures. For example, some aspects of the disclosure provide techniques that may enable computing platforms to detect step completion inputs in the video content, generate video segments corresponding to different steps based on the step completion inputs, and reorder the video segments to improve their effectiveness in providing sensor device assembly instruction.

In accordance with an embodiment of the disclosure, a computing platform comprising at least one processor, a communication interface, and memory storing computing readable instructions may receive, from a first enhanced reality device, video content including one or more step completion inputs. Based on the one or more step completion inputs, the computing platform may mark data packets in the video content. Based on the marked data packets, the computing platform may generate video segments. The computing platform may refine the video segments to remove the one or more step completion inputs from the video segments. Using the refined video segments, the computing platform may generate a first reverse video content output stream, which may entail reversing an order of the refined video segments. The computing platform may send, to a second enhanced reality device, the first reverse video content output stream. Using machine learning analysis and based on the video content, the computing platform may determine a maintenance update corresponding to a sensor device shown in the video content. The computing platform may generate one or more commands directing a maintenance database to update a stored maintenance log and to cause the sensor device to perform a setting adjustment based on the maintenance update. The computing platform may send, to the maintenance database, the one or more commands directing the maintenance database to update the stored maintenance log and to cause the sensor device to perform a setting adjustment.

In one or more embodiments, the computing platform may establish, with a first enhanced reality device, a first wireless data connection. The computing platform may establish, with a second enhanced reality device, a second wireless data connection. The computing platform may establish with a maintenance database, a third wireless data connection.

In one or more embodiments, the computing platform may determine an end of a step performed in the video content based on the one or more step completion inputs, and the one or more step completion inputs may be one of: voice commands, hand gestures, head gestures, or touch inputs detected by the first enhanced reality device. In one or more embodiments, the computing platform may determine one or more particular steps in a process for deconstructing a sensor device based on each video segment may correspond to a portion of the video content associated with conducting a particular step of the one or more particular steps in the process for deconstructing the sensor device.

In one or more embodiments, the computing platform may detect the one or more step completion inputs using one or more of voice recognition, motion detection, or machine learning analysis. In one or more embodiments, the computing platform may perform object recognition on the video content. The computing platform may perform machine learning analysis on the video content. Based on results of the object recognition and the machine learning analysis, the computing platform may generate safety notifications. The computing platform may modify the first reverse video content output stream to include the safety notifications based on the results of the object recognition and the machine learning analysis.

In one or more embodiments, the computing platform may store the first reverse video content output stream. In one or more embodiments, the computing platform may include video content may contain video footage of deconstruction of a sensor device in the video content.

In one or more embodiments, the computing platform may receive a content request input from the second enhanced reality device, which may be a request for instructional video content corresponding to assembly of the sensor device.

In one or more embodiments, the computing platform may generate one or more commands directing the second enhanced reality device to cause display of the first reverse video content output stream. The computing platform may send, to the second enhanced reality device, the one or more commands directing the second enhanced reality device to cause display of the first reverse video content output stream.

In one or more embodiments, the computing platform may determine a geolocation of the second enhanced reality device. Based on the geolocation of the second enhanced reality device, the computing platform may select the first reverse video content output stream.

In one or more embodiments, the setting adjustment may be an adjustment to a temperature, pressure, or flow rate of the sensor device. In one or more embodiments, the computing platform may determine that a second reverse video content output stream should be generated, which may be the video content streaming in a reverse playback mode.

In one or more embodiments, the computing platform may generate one or more commands directing the first enhanced reality device to cause display of a reverse audio input interface that prompts a user of the first enhanced reality device to record a reverse audio input. The computing platform may send, to the first enhanced reality device, the one or more commands directing the first enhanced reality device to cause display of a reverse audio input interface that prompts a user of the first enhanced reality device to record a reverse audio input, and may receive the reverse audio input.

In one or more embodiments, the reverse audio input interface may include the video content streaming in a reverse playback mode. In one or more embodiments, the reverse audio input may be audio corresponding to a reconstruction process of the sensor device and may be an audio overlay for the video content playing in a reverse playback mode.

In one or more embodiments, the computing platform may extract existing audio from the video segments, and may insert the reverse audio input into the video segments. In one or more embodiments, after extracting the existing audio from the video segments, the computing platform may generate the second reverse video content output stream, which may correspond to the video content playing in a reverse playback mode. After inserting the reverse audio input into the video segments, the computing platform may store the second reverse video content output stream.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for deploying a content processing output platform that generates reversible procedure video outputs in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Workers may dismantle complex objects for maintenance and repair work that may later need to be reassembled. An experienced person that has performed the dismantling many times before may be able to remember the reassembly order, or the worker may repeatedly consult assembly documents in order to remember the correct order to follow to reassemble the object.

Many workers have experienced the difficulty of remembering the exact order of how to reassemble a complex object. This disclosure describes a way to simplify recordation of the dismantling process and to help the worker through steps to reassemble the object. A user may be able to skip over steps already known or may go back and repeat steps they may be struggling with. The systems and methods described herein differ from merely recording the dismantling process and watching the dismantling process to try and learn how to reassemble an object because they facilitate the automation of reordering of a recording of the assembly steps.

Workers may be able to record the dismantling procedure using a video recording device that may also support voice or gesture recognition. The recording device may automatically detect when each step is complete, or the worker may be able to indicate to the recording device when each step is complete and a new step is commencing through a simple voice command or gesture. Once the worker indicates that the entire process is completed, the system may automatically break up the steps and reassemble them in reverse order so that they may be replayed to aid the reassembly process. During the replay process, the worker may be able to interact and control playback of steps through the use of voice commands and/or gestures. These commands may allow the worker to skip forward over steps, rewind back over prior steps, pause, or the like.

Figure 1A:
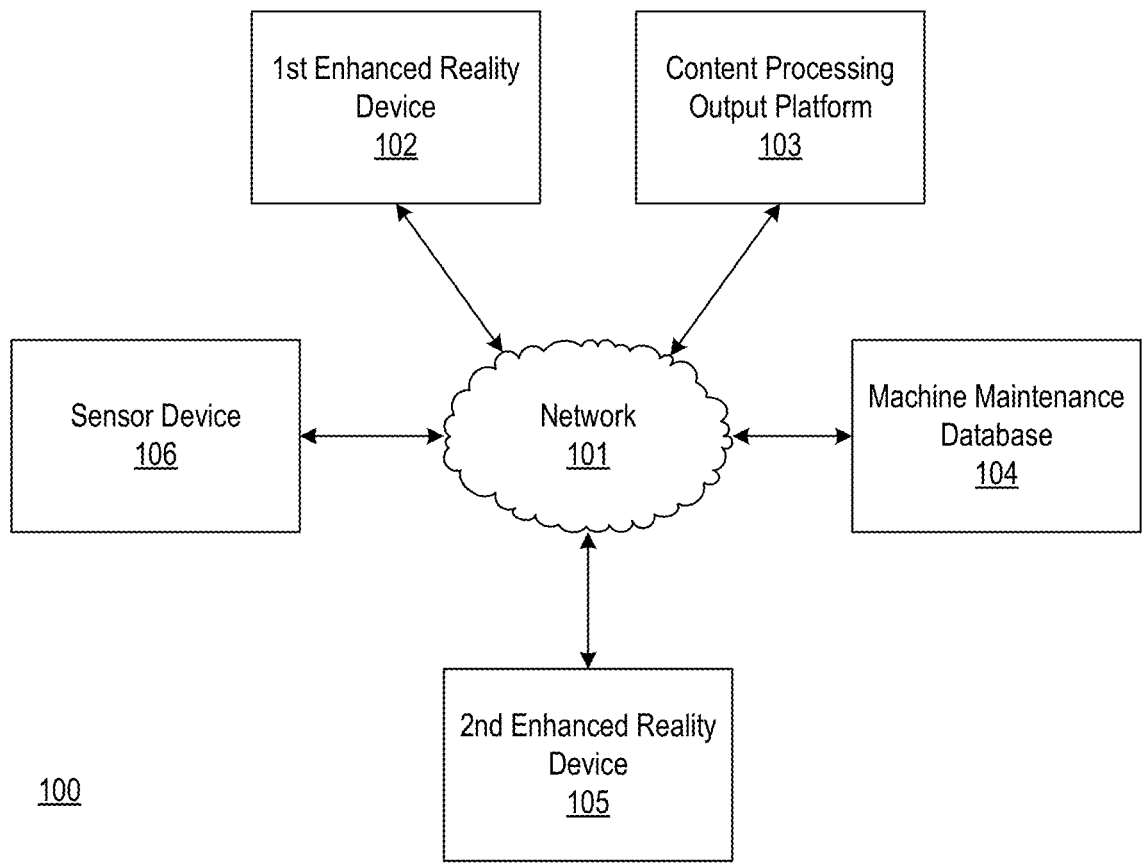
FIGS. 1A and 1B depict an illustrative computing environment for deploying a content processing output platform that generates reversible procedure video outputs in accordance with one or more example embodiments.
Figure 1B:
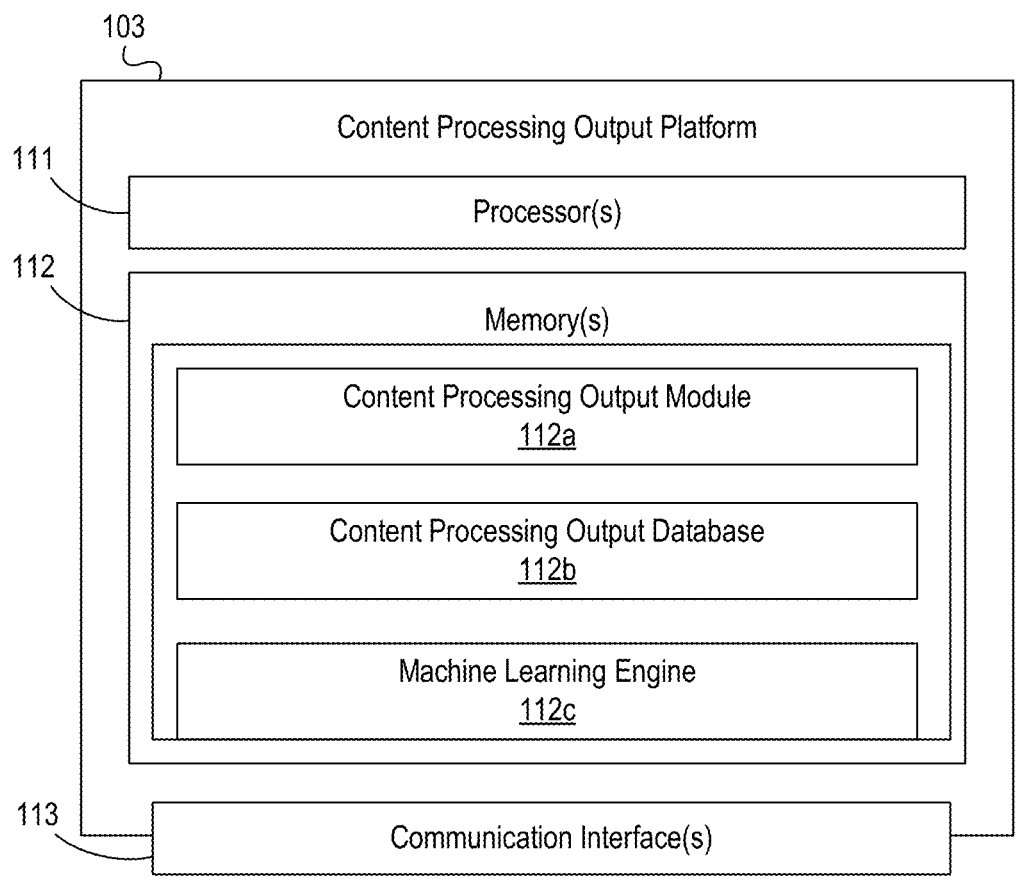

FIGS. 1A-1B depict an illustrative computing environment for deploying a content processing output platform that generates reversible procedure video outputs in accordance with one or more example embodiments. Referring to FIG. 1A, computing environment 100 may include one or more computer systems. For example, computing environment 100 may include a first enhanced reality device 102, a content processing output platform 103, a machine maintenance database 104, a second enhanced reality device 105, and/or a sensor device 106.

First enhanced reality device 102 may be a computer system that includes one or more computing devices and/or other computer components (e.g., processors, memories, communication interfaces). In addition, first enhanced reality device 102 may be configured to receive requests (e.g., requests to record content, cause display of content, mark content for segmentation, or the like.) In some instances, the first enhanced reality device 102 may be configured to receive gesture inputs, voice commands, or the like to indicate the requests. In some instances, the first enhanced reality device 102 may be a virtual reality (VR) headset, mixed-reality headset, augmented reality (AR) glasses, a near eye device, a near eye device, a mobile device, or the like. In some instances, the first enhanced reality device 102 may also include one or more various input devices such as controllers, sensors, microphones, or the like that may be capable of receiving input.

As illustrated in greater detail below, content processing output platform 103 may include one or more computing devices configured to perform one or more of the functions described herein. For example, content processing output platform 103 may include one or more computers (e.g., laptop computers, desktop computers, servers, server blades, or the like). In one or more examples, the content processing output platform 103 may correspond to a cloud computing platform. In one or more examples, the content processing output platform 103 may be configured to receive content, generate reverse video output streams, host the reverse video output streams, process requests for reverse video output streams, generate maintenance commands, and the like.

In addition, and as illustrated in greater detail below, content processing output platform 103 may be configured to generate, host, transmit, and/or otherwise provide one or more graphical user interfaces (which may, e.g., cause one or more other computer systems to display and/or otherwise present the graphical user interfaces). In some instances, the graphical user interfaces generated by the content processing output platform 103 may be associated with an internal portal provided by an organization, such as an internal device reassembly portal corresponding to various devices manufactured or used by the organization. Such a portal may, for instance, provide employees of the organization with the ability to reassemble the devices, deconstruct the devices, identify failures, update maintenance logs, and/or provide employees of the organization with menus, controls, and/or other options to execute various actions with regard to the various devices.

Machine maintenance database 104 may include one or more computing devices configured to perform one or more of the functions described herein. For example, machine maintenance database 104 may include one or more computers (e.g., laptop computers, desktop computers, servers, server blades, or the like). In addition, machine maintenance database 104 may be configured to receive and store maintenance records corresponding to one or more sensor devices. The machine maintenance database 104 may be configured to receive commands to update one or more maintenance records and to generate commands directing one or more sensor devices to perform a shutoff and/or setting adjustment.

Second enhanced reality device 105 may be a computer system that includes one or more computing devices and/or other computer components (e.g., processors, memories, communication interfaces). In addition, second enhanced reality device 105 may be configured to receive requests (e.g., requests to record content, cause display of content, mark content for segmentation, or the like.) In some instances, the second enhanced reality device 105 may be configured to receive gesture inputs, voice commands, or the like to indicate the requests. In some instances, the second enhanced reality device 105 may be a virtual reality (VR) headset, mixed-reality headset, augmented reality (AR) glasses, a near eye device, a near eye device, a mobile device, or the like. In some instances, the second enhanced reality device 105 may also include one or more various input devices such as controllers, sensors, microphones, or the like that may be capable of receiving input.

Sensor device 106 may be a system that may include one or more additional systems and/or components (e.g., a valve, heater, switch, pipe, circuit, or the like) of a larger system (e.g., electronics, hardware, appliances, plant, or the like). In some instances, the sensor device 106 may be configured to receive commands from a computer system, such as shutoff and/or setting adjustment commands from the content processing output platform 103 and/or machine maintenance database 104.

Computing environment 100 also may include one or more networks, which may interconnect first enhanced reality device 102, content processing output platform 103, machine maintenance database 104, second enhanced reality device 105, and/or sensor device 106. For example, computing environment 100 may include a network 101 (which may interconnect, e.g., first enhanced reality device 102, content processing output platform 103, machine maintenance database 104, second enhanced reality device 105, and/or sensor device 106).

In one or more arrangements, first enhanced reality device 102, content processing output platform 103, machine maintenance database 104, second enhanced reality device 105, sensor device 106, and/or the other systems included in computing environment 100 may be any type of computing device capable of receiving a user interface, receiving input via the user interface, and communicating the received input to one or more other computing devices. For example, first enhanced reality device 102, content processing output platform 103, machine maintenance database 104, second enhanced reality device 105, sensor device 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of first enhanced reality device 102, content processing output platform 103, machine maintenance database 104, second enhanced reality device 105, and sensor device 106 may, in some instances, be special-purpose computing devices configured to perform specific functions.

Referring to FIG. 1B, content processing output platform 103 may include one or more processors 111, memory 112, and communication interface 113. A data bus may interconnect processor 111, memory 112, and communication interface 113. Communication interface 113 may be a network interface configured to support communication between content processing output platform 103 and one or more networks (e.g., network 101, or the like). Memory 112 may include one or more program modules having instructions that when executed by processor 111 cause content processing output platform 103 to perform one or more functions described herein and/or one or more databases that may store and/or otherwise maintain information which may be used by such program modules and/or processor 111. In some instances, the one or more program modules and/or databases may be stored by and/or maintained in different memory units of content processing output platform 103 and/or by different computing devices that may form and/or otherwise make up content processing output platform 103. For example, memory 112 may have, store, and/or include a content processing output module 112a, a content processing output database 112b, and a machine learning engine 112c. Content processing output module 112a may have instructions that direct and/or cause content processing output platform 103 to execute advanced content processing techniques, as discussed in greater detail below. Content processing output database 112b may store information used by content processing output module 112a and/or content processing output platform 103 in content processing and/or in performing other functions. Machine learning engine 112c may have instructions that direct and/or cause the content processing output platform 103 to generate reversible procedure video outputs and to set, define, and/or iteratively refine optimization rules and/or other parameters used by content processing output platform 103 and/or other systems in computing environment 100.

Figure 2A:
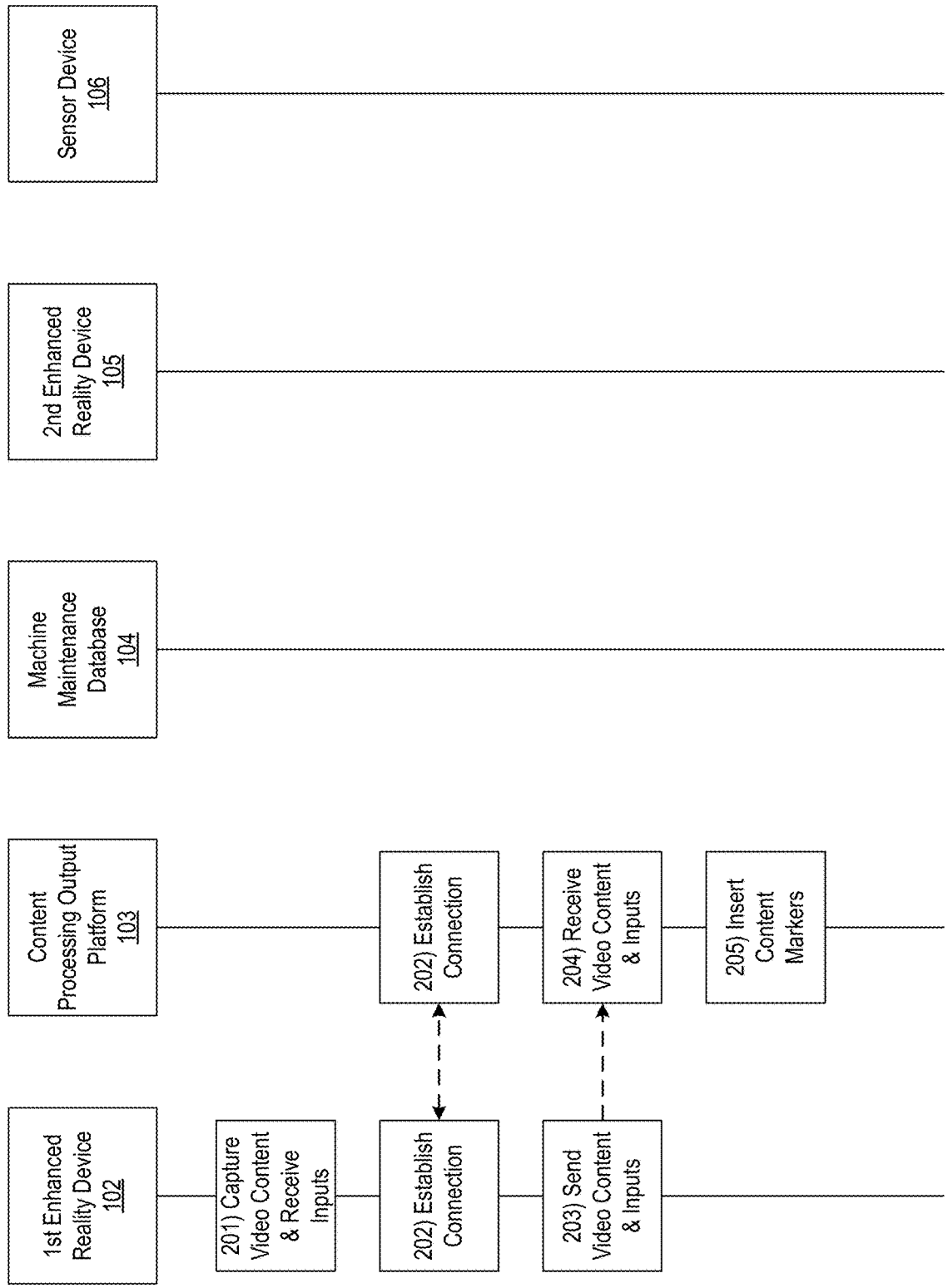

FIGS. 2A-2I depict an illustrative event sequence for deploying a content processing output platform 103 that may perform advanced reversible procedure video output generation in accordance with one or more example embodiments. Referring to FIG. 2A, at step 201, a first enhanced reality device, such as first enhanced reality device 102, may capture video content and receive one or more step completion inputs indicating video segmentation. In one or more instances, in capturing the video content, the first enhanced reality device 102 may capture video content corresponding to deconstruction of a device, such as the sensor device 106. As a simplified example, the first enhanced reality device 102 may capture video content corresponding to video stream 305, which is shown in FIG. 3. Video stream 305 shows deconstruction of a brick pile through three sequential frames. It should be understood that although video stream 305 depicts deconstruction of a brick pile, the video stream 305 may depict deconstruction of any system (appliance, electronics, hardware, plant, or the like) or component of a larger system (e.g., a valve, switch, heater, compressor, rotating equipment, pipe, circuit, or the like).

In one or more instances, in receiving the step completion inputs, the first enhanced reality device 102 may receive gesture inputs (e.g., hand gestures, head gestures, or the like), voice commands (e.g., "step complete," "next step," or the like), inputs via a display (e.g., selection of a next step icon or the like), and the like. In receiving the step completion inputs, the first enhanced reality device 102 may receive a user input to indicate completion of a step (e.g., a portion of the deconstruction/reconstruction process). For example, the first enhanced reality device 102 may be capturing video content of a user deconstructing the sensor device 106. The first enhanced reality device 102 may capture video of the user removing a panel from the sensor device 106, and may subsequently receive a step completion input from the user indicating completion of a first step of the overall deconstruction process. In one or more instances, the step completion inputs may be metadata embedded in the captured video. The first enhanced reality device 102 may continue to capture video content and receive step completion inputs until an end of the deconstruction process is determined (e.g., via a voice command, gesture input, display input, object recognition, or the like).

At step 202, the first enhanced reality device 102 may establish a connection with the content processing output platform 103. For example, the first enhanced reality device 102 may establish a first wireless data connection with the content processing output platform 103 to link the first enhanced reality device 102 to the content processing output platform 103. In one or more instances, the connection may be or might not be a direct connection between the first enhanced reality device 102 and the content processing output platform 103. In one or more instances, after initially establishing the connection with the content processing output platform 103, the first enhanced reality device 102 might not subsequently repeat this step.

At step 203, the first enhanced reality device 102 may send the captured video content and the step completion inputs received at step 201 to the content processing output platform 103. In one or more instances, the first enhanced reality device 102 may send the captured video content and the step completion inputs to the content processing output platform 103 via the communication interface 113 and while the first wireless data connection is still established.

At step 204, the content processing output platform 103 may receive the video content and the step completion inputs sent at step 203. In one or more instances, the content processing output platform 103 may receive the video content and the step completion inputs via the communication interface 113 and while the first wireless data connection is established.

At step 205, the content processing output platform 103 may insert content markers into the video content based on the step completion inputs. In one or more instances, the content processing output platform 103 may extract metadata, corresponding to the step completion inputs, from the video content. In one or more instances, the content processing output platform 103 may detect step completion inputs using voice recognition, motion detection, machine learning analysis, automated video or sound analysis, or the like. Using the step completion inputs, which may indicate a timestamp during the video content at which a deconstruction step is completed, the content processing output platform 103 may mark a data packet in the video content to indicate an end of a first video segment. The first video segment may correspond to the first deconstruction step shown in the video content. For example, the first video segment may correspond to the first frame shown in video stream 305.

After marking the data packet to indicate the end of the first video segment, the content processing output platform 103 may mark the next data packet in the video content to indicate a start of a second video segment corresponding to a second step in the deconstruction process. In one or more instances, the content processing output platform 103 may continue to mark data packets in the video content based on the step completion indications until data packets corresponding to each step completion input have been completed.

Figure 2B:
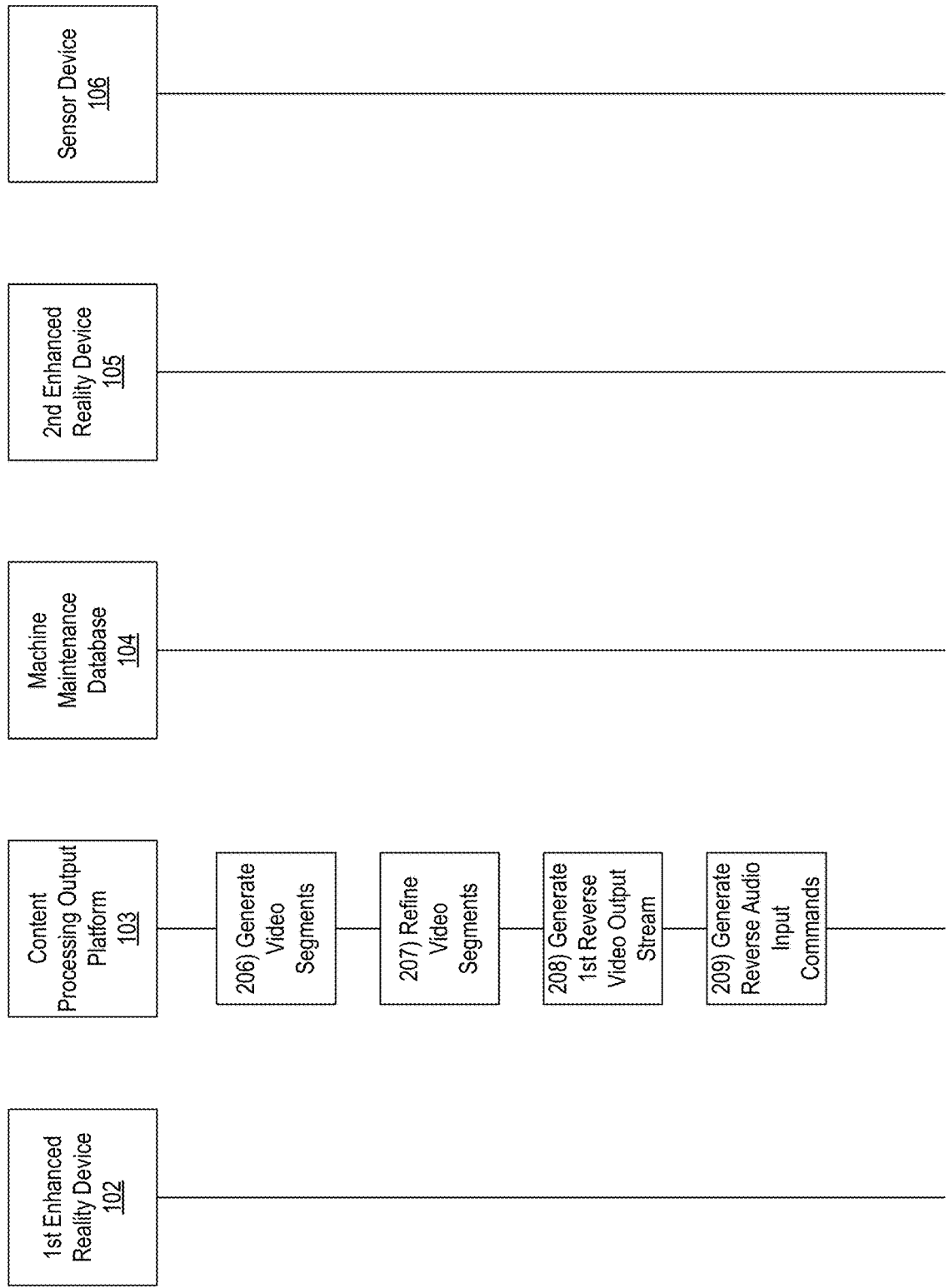
Figure 3:
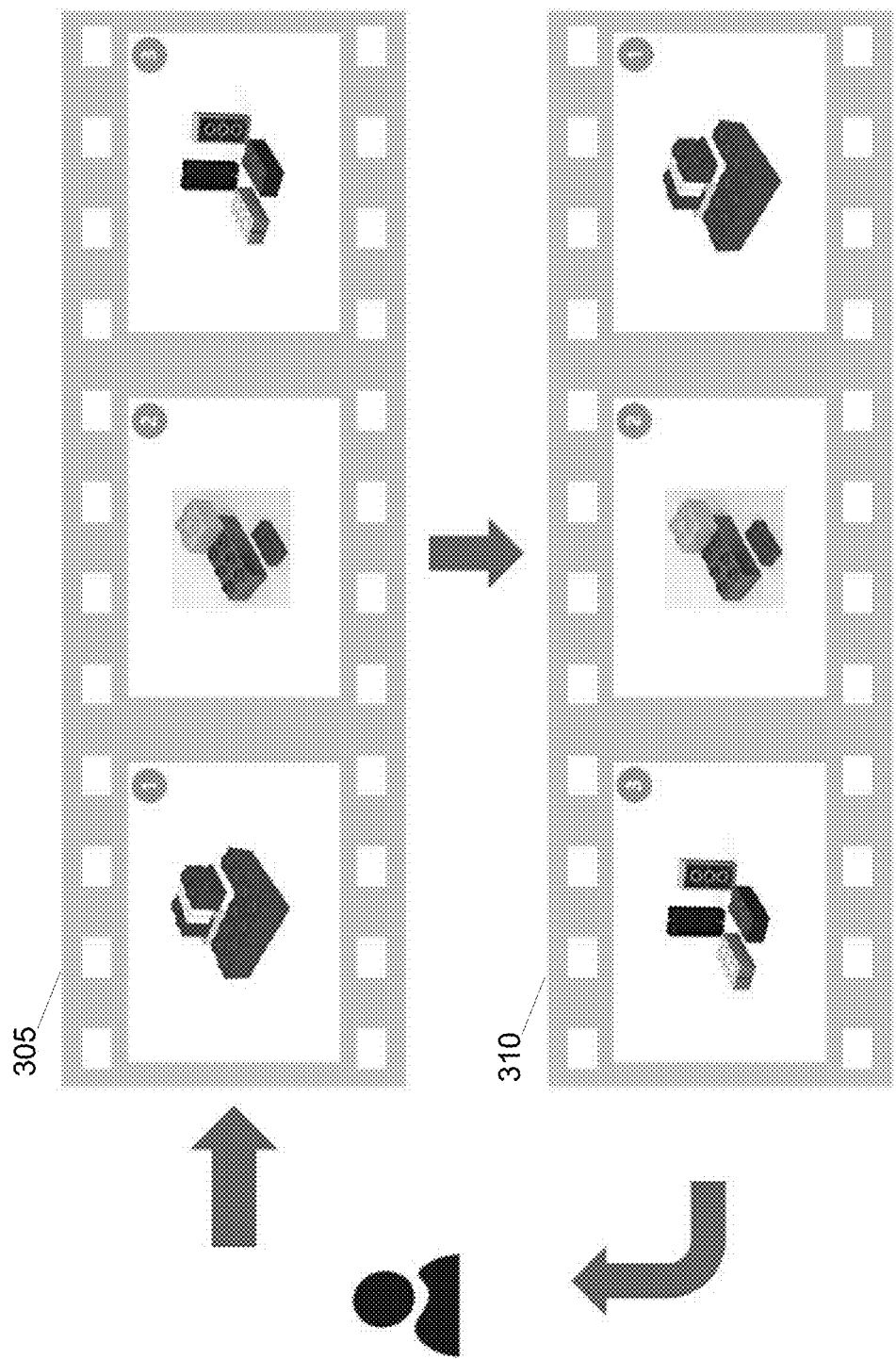
FIG. 3 depicts example video streams corresponding to a content processing output platform that generates reversible procedure video outputs in accordance with one or more example embodiments.

Referring to FIG. 2B, at step 206, the content processing output platform 103 may generate video segments corresponding to the video content based on the marked data packets. In one or more instances, the content processing output platform 103 may generate video segments by detecting the start and end data packet markings applied at step 205. For example, referring to the brick deconstruction model shown in FIG. 3, content processing output platform 103 may generate a first segment corresponding to the first frame of the video stream 305, a second segment corresponding to the second frame of the video stream 305, and a third segment corresponding to the third frame of the video stream 305. In this example, the first segment may correspond to a first deconstruction step, the second segment may correspond to a second deconstruction step, and the third segment may correspond to a third deconstruction step.

At step 207, the content processing output platform 103 may refine the video segments generated at step 206. In one or more instances, the content processing output platform 103 may modify an audio stream corresponding to each video segment. In these instances, the content processing output platform 103 may detect a voice command in the audio stream corresponding to a step completion indication (e.g., "end of step"). After detecting the voice command, the content processing output platform 103 may extract the portion of the audio stream containing the step completion indication. As an example, a user may wave a hand in front of the camera to signal completion of each step. This may affect the quality of the video (e.g., annoy a viewer), so the content processing output platform 103 may automatically remove the hand waving from between the video step segments. In one or more instances, the content processing output platform 103 may repeat this procedure for each video segment.

Additionally or alternatively, the content processing output platform 103 may modify a video stream corresponding to each video segment. In these instances, the content processing output platform 103 may detect a voice command in the audio stream corresponding to a step completion indication (e.g., "end of step") as described above. But rather than extracting the portion of the audio stream containing the step completion indication as described above, the content processing output platform 103 may extract the portion of the video content (and the corresponding audio) corresponding to the portion of the audio stream. Additionally or alternatively, the content processing output platform 103 may detect a gesture input (e.g., a hand movement, head movement, or the like) in the video segment that corresponds to a step completion indication. In these instances, the content processing output platform 103 may similarly extract the portion of the video content (and the corresponding audio) that contains the step completion indication.

In one or more instances, the content processing output platform 103 may detect gesture inputs in some video segments and voice commands in other segments that correspond to step completion indications. In these instances, the content processing output platform 103 may perform a mixture of audio and video processing. In refining the video segments, the content processing output platform 103 may improve the quality of the video or audio segments for playback during the reconstruction process. For example, irrelevant audio may be removed (e.g., by muting the audio during a portion of the video that includes the irrelevant audio). As another example, video may be enhanced (e.g., the content processing output platform 103 may adjust a brightness, a contrast, a sharpness, a color, a stability, or the like) in order to improve the video quality. Thus, by improving the quality of the video or audio segments, a user watching a segment corresponding to a first step of the reconstruction process might not be distracted by a seemingly irrelevant voice command and/or poor video quality caused by a head gesture intended to indicate a step completion input (e.g., because the first enhanced reality device may be mounted on the users head thus head movements may impact video recordation).

At step 208, the content processing output platform 103 may generate a first reverse video output stream based on the refined video segments generated at step 207. In one or more instances, the content processing output platform 103 may reorder the refined video segments so that the video segment occurring last in the original video content is displayed first and the video segment occurring first in the original video content is displayed last. In one or more instances, in generating the first reverse video output stream, the content processing output platform 103 may generate a video stream similar to video stream 310, shown in FIG. 3. For example, referring back to the simplified brick pile deconstruction example of FIG. 3, the first segment of video stream 305 may be moved so that the final segment of video stream 310 and the third segment of video stream 305 may be moved so that the first segment of video stream 310. In doing so, the content processing output platform 103 may reorganize the video content recorded during the deconstruction process for use in a reconstruction process (e.g., a user may put the pile of bricks back together using video stream 310).

At step 209, the content processing output platform 103 may generate one or more commands directing the first enhanced reality device 102 to generate a reverse audio input interface. In one or more instances, in generating the one or more commands to generate a reverse audio input interface, the content processing output platform 103 may generate one or more commands directing the first enhanced reality device 102 to prompt the user for an additional audio input corresponding to a reconstruction process and for use in a second reverse video output stream. In one or more examples, the content processing output platform 103 may generate one or more commands directing the first enhanced reality device 102 to prompt the user for audio that may be merged with a version of the originally recorded video content playing in a reverse mode. In one or more instances, the one or more commands directing the first enhanced reality device 102 to generate a reverse audio input interface may direct the first enhanced reality device 102 to cause display of a graphical user interface indicating the request for audio and/or causing display of the video content in a reverse playback mode (e.g., that the user may use for reference in recording additional audio).

Figure 2C:
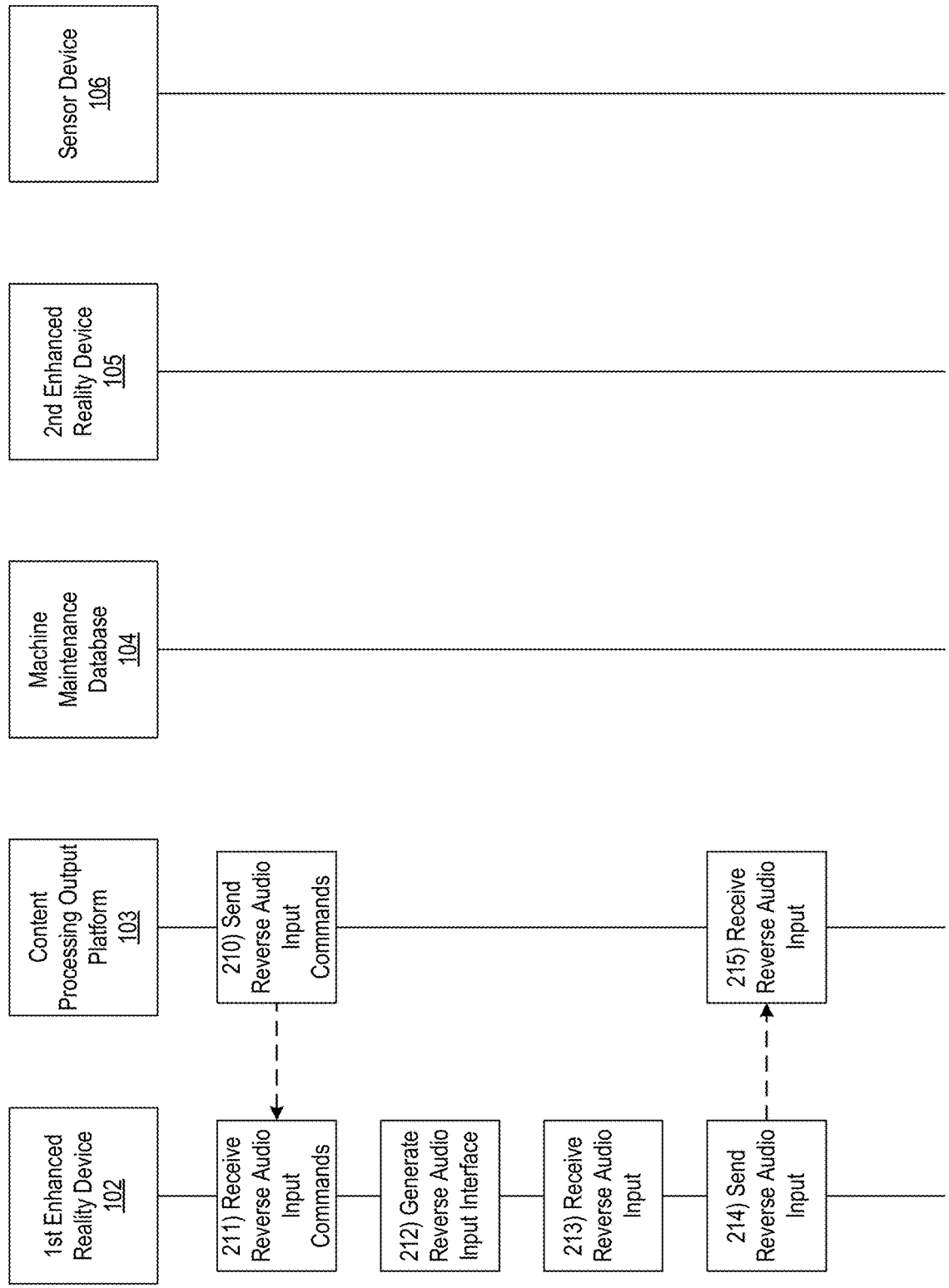

Referring to FIG. 2C, at step 210, the content processing output platform 103 may send the one or more commands directing the first enhanced reality device 102 to generate a reverse audio input interface to the first enhanced reality device 102. In one or more instances, the content processing output platform 103 may send the one or more commands directing the first enhanced reality device 102 to generate a reverse audio input interface via the communication interface 113 while the first wireless data connection is established.

At step 211, the first enhanced reality device 102 may receive the one or more commands directing the first enhanced reality device 102 to generate a reverse audio input interface sent at step 210. In one or more instances, the first enhanced reality device 102 may receive the one or more commands directing the first enhanced reality device 102 to generate a reverse audio input interface while the first wireless data connection is established.

At step 212, the first enhanced reality device 102 may generate a reverse audio input interface based on the one or more commands directing the first enhanced reality device 102 to generate the reverse audio input interface. In one or more instances, in generating the reverse audio input interface, the first enhanced reality device 102 may generate a textual overlay to be displayed at the first enhanced reality device 102 that prompts the user to record additional audio. In one or more instances, in displaying the reverse audio input interface, the first enhanced reality device 102 may also display the video content in a reverse playback mode so that the user may effectively narrate the video content for purposes of a reconstruction process (e.g., instead of the deconstruction that was recorded at step 201).

At step 213, the first enhanced reality device 102 may receive a reverse audio input. In one or more instances, the first enhanced reality device 102 may receive the reverse audio input by receiving an audio input that corresponds to narration of a reconstruction/assembly process of a device, such as the sensor device 106. The device may be a device that was deconstructed in the video content recorded at step 201.

At step 214, the first enhanced reality device 102 may send the reverse audio input generated at step 213 to the content processing output platform 103. In one or more instances, the first enhanced reality device 102 may send the reverse audio input to the content processing output platform 103 while the first wireless data connection is established.

At step 215, the content processing output platform 103 may receive the reverse audio input send at step 214 from the first enhanced reality device 102. In one or more instances, the content processing output platform 103 may receive the reverse audio input via the communication interface 113 while the first wireless data connection is established.

Figure 2D:
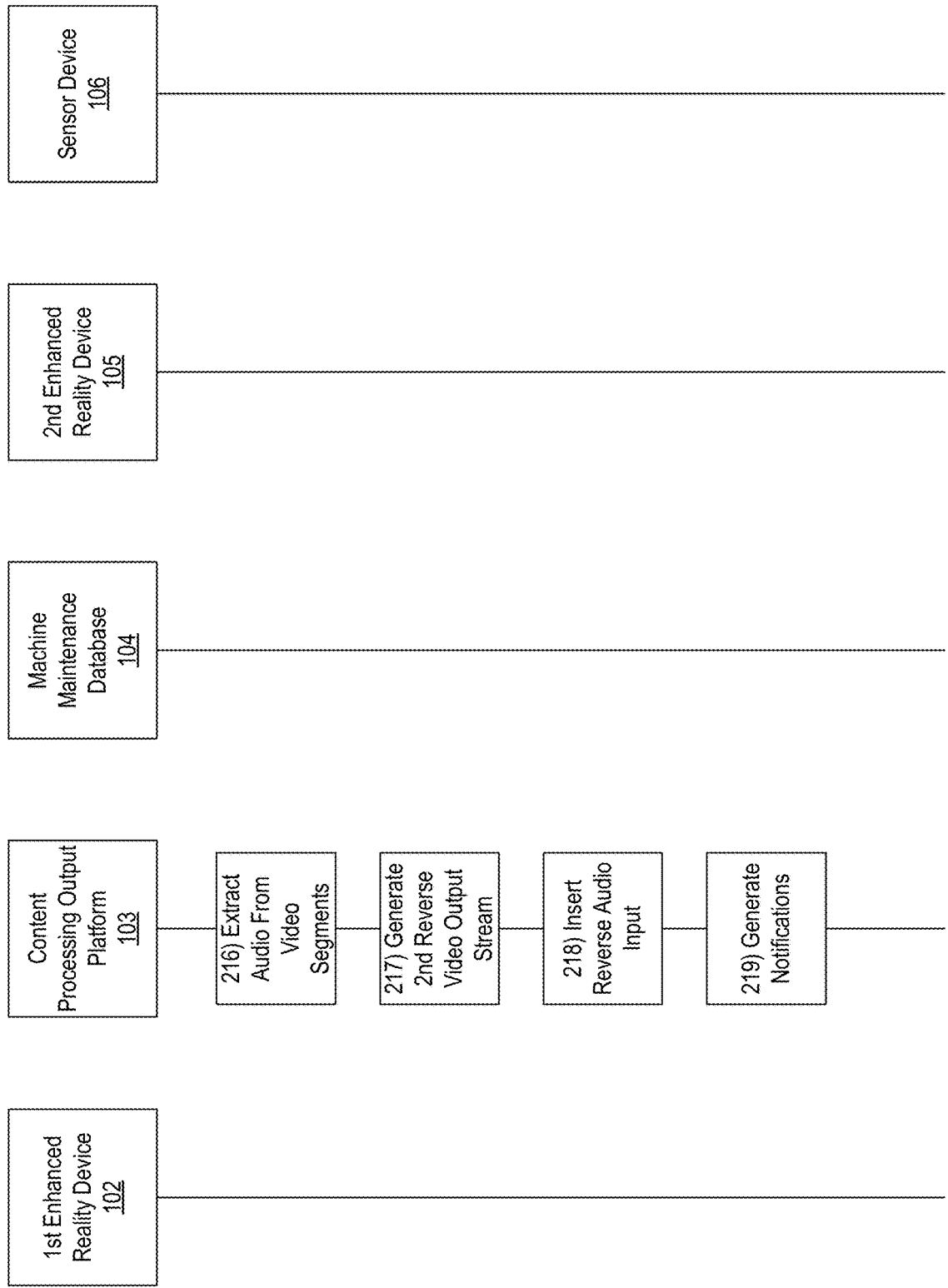

Referring to FIG. 2D, at step 216, the content processing output platform 103 may extract the original audio from the video content. In one or more instances, by extracting the original audio, the content processing output platform 103 may generate a video stream that might not have audio. By extracting the original audio, the content processing output platform 103 may extract audio corresponding to the deconstruction of the sensor device 106.

At step 217, the content processing output platform 103 may generate a second reverse video output stream corresponding to the video content recorded at step 201. In one or more instances, the content processing output platform 103 may generate the second reverse video output stream using the video segments generated at step 206. In one or more instances, the content processing output platform 103 may generate the second reverse video output stream by generating a reverse playback version of the video content (e.g., the video content played backwards).

At step 218, the content processing output platform 103 may insert the reverse audio input into the second reverse video output stream. For example, reverse audio (unlike reverse video) may be unintelligible, so the content processing output platform 103 may generate the reverse audio input to make audio corresponding to the second reverse video output stream useable before inserting audio into the second reverse video output stream. In one or more instances, in inserting the reverse audio input into the second reverse video output stream, the content processing output platform 103 may break the audio into clips based on different steps, and then may play forward audio corresponding to those steps along with reversed video of those clips. In these instances, in breaking up the audio clips, the content processing output platform 103 may perform voice recognition and may take into account the start or end of sentences so that useful information is not lost. Additionally or alternatively, the content processing output platform 103 may use voice recognition to filter out irrelevant comments.

By inserting the reverse audio input into the second reverse video output stream, the content processing output platform 103 may add audio to the second reverse video output stream. In doing so, the content processing output platform 103 may generate an audio-visual output that corresponds to a reconstruction process of the sensor device 106. In one or more instances, the content processing output platform 103 may generate this second reverse video output stream in addition to the first reverse video output stream. In additional instances, the content processing output platform 103 may generate this second reverse video output stream as an alternative to the first reverse video output stream.

At step 219, the content processing output platform 103 may generate one or more notifications based on the video content. In one or more instances, in generating the notifications, the content processing output platform 103 may generate notifications that a particular step is important, that a particular step is mandatory based on compliance regulations, highlighting a safety concern, or the like. In one or more instances, in generating the one or more notifications the content processing output platform 103 may generate video overlays that may be displayed by an enhanced reality device. In one or more instances, the content processing output platform 103 may determine which notification should be displayed along with a particular step by performing object recognition and machine learning analysis on the video content. For example, the content processing output platform 103 may determine that a particular safety concern is relevant to a particular step, and thus may generate a notification indicating the safety concern.

Figure 2E:
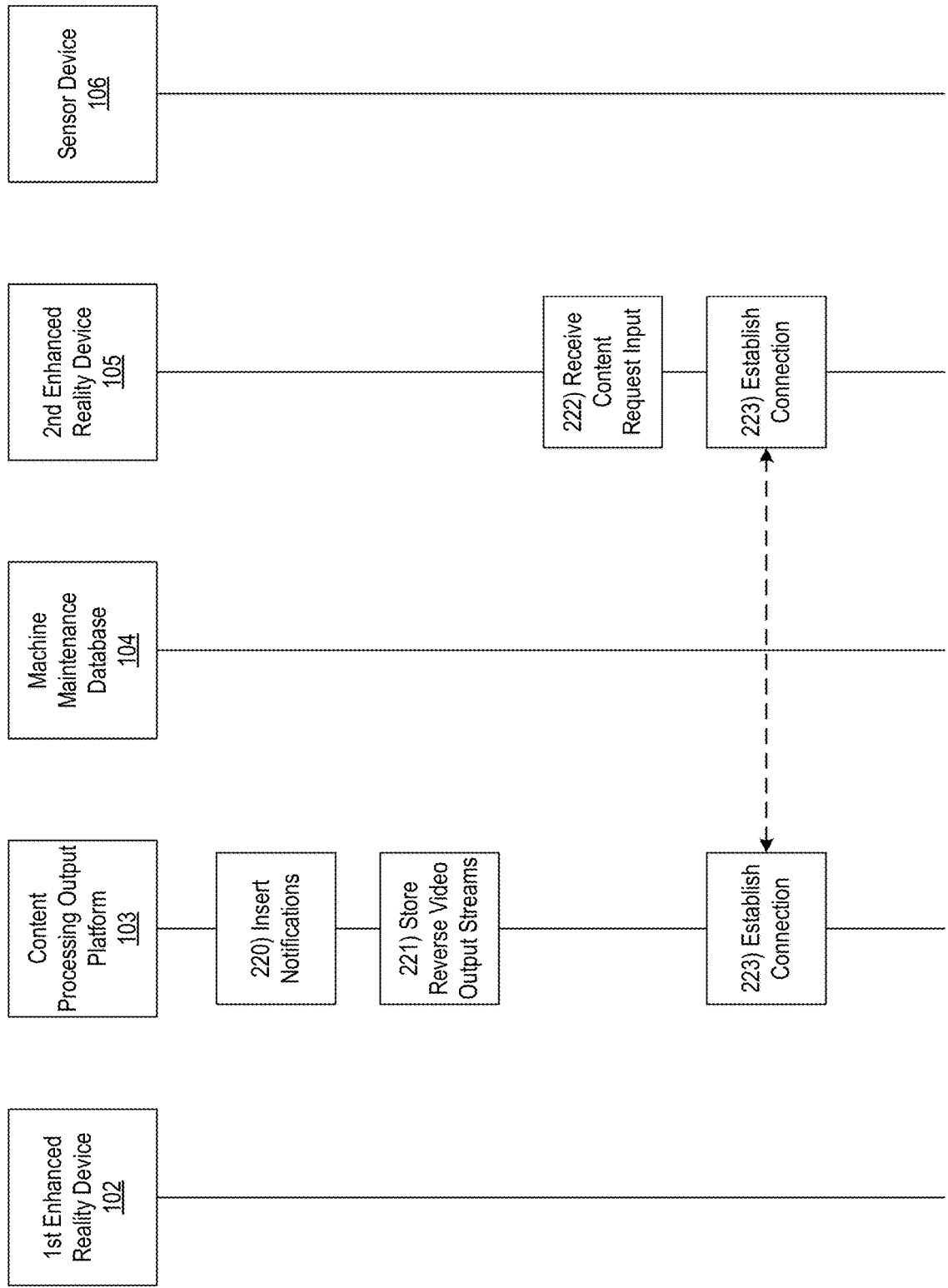

Referring to FIG. 2E, at step 220, the content processing output platform 103 may insert the notifications into the first and second reverse video output streams. In one or more instances, the content processing output platform may insert the same notifications into the first and second reverse video output streams. Alternatively, the content processing output platform 103 may insert different notifications into the first and second revise video output streams. In one or more instances, in inserting the notifications, the content processing output platform 103 may insert closed captions, graphical video overlays, audio notifications, or the like. In one or more instances, the notifications may be displayed at the first enhanced reality device 102. Additionally or alternatively, the notifications may be displayed at another device, such as second enhanced reality device 105.

At step 221, the content processing output platform 103 may store the first and second reverse video output streams at the content processing output database 112*b*. At step 222, the second enhanced reality device 105 may receive a content request input. In one or more instances, in receiving the content request input, the second enhanced reality device 105 may receive a request to cause display of instructional video content related to assembly of the sensor device 106. In one or more instances, in receiving the content request input, the second enhanced reality device 105 may receive an input via a display of the second enhanced reality device 105, a voice command, a gesture input, or the like. In one or more instances, the second enhanced reality device 105 may cause display of a stored content listing, and the content request input may indicate a selection of an item of stored content. For example, in causing display of the stored content listing, the second enhanced reality device 105 may cause display of a plurality of tiles each corresponding to a stored content item (e.g., the first and second reverse video output streams), and a user may select a stored content item by selecting the tile. Additionally or alternatively, the content processing output platform 103 may determine a geolocation corresponding the second enhanced reality device 105, and may determine, based on the geolocation, the item of stored content. For example, in determining, based on the geolocation, the item of stored content, the content processing output platform 103 may determine that a geolocation of the second enhanced reality device 105 corresponds to a geolocation of the sensor device 106. Accordingly, the content processing output platform 103 may determine an item of stored content corresponding to the sensor device 106. Additionally, or alternatively, the content processing output platform 103 may determine, using object recognition, a particular sensor (e.g., temperature sensor, motion sensor, camera, or the like) embedded in the sensor device 106. In these instances, the content processing output platform 103 may determine, based on the particular sensor, the item of stored content. Additionally or alternatively, the content processing output platform 103 may identify a user of the second enhanced reality device 105 (e.g., via facial recognition, log in credentials, or the like) and may determine an item of stored content previously viewed by the user. In these instances, the content processing output platform 103 may determine a previous stopping point in the content (e.g., at which the user paused), and may provide a notification with an option for the user to resume the content at the previous stopping point. Although step 221 is described with regard to the second enhanced reality device 105, a content request input may, additionally or alternatively, be received by the first enhanced reality device 102.

At step 223, the second enhanced reality device 105 may establish a connection with the content processing output platform 103. In one or more instances, the second enhanced reality device 105 may establish a second wireless data connection with the content processing output platform 103 to link the second enhanced reality device 105 to the content processing output platform 103. In one or more instances, the connection may be or might not be a direct connection between the second enhanced reality device 105 and the content processing output platform 103. In one or more instances, after initially establishing the connection with the content processing output platform 103, the second enhanced reality device 105 might not subsequently repeat this step.

Figure 2F:
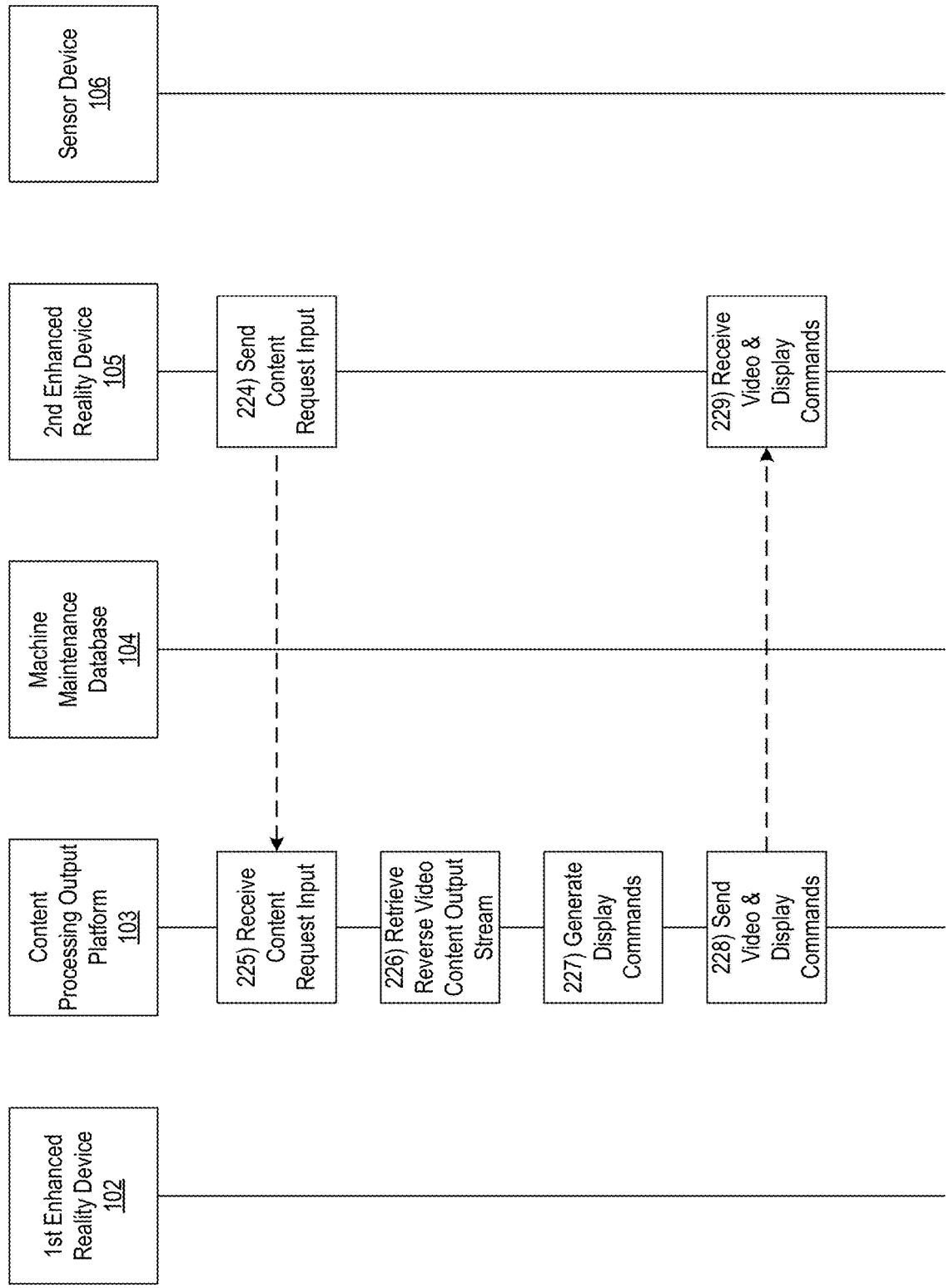

Referring to FIG. 2F, at step 224, the second enhanced reality device 105 may send the content request input received at step 222 to the content processing output platform 103. In one or more instances, the second enhanced reality device 105 may send the content request input to the content processing output platform 103 while the second wireless data connection is established.

At step 225, the content processing output platform 103 may receive the content request input sent at step 224. In one or more instances, the content processing output platform 103 may receive the content request input via the communication interface 113 and while the second wireless data connection is established.

At step 226, the content processing output platform 103 may retrieve a reverse video content output stream (e.g., the first reverse video content output stream or the second reverse video content output stream) indicated by the content request input received at step 225.

At step 227, the content processing output platform 103 may generate one or more commands directing the second enhanced reality device 105 to cause display of the reverse video content output stream retrieved at step 226. At step 228, the content processing output platform 103 may send the reverse video content output stream and the one or more commands directing the second enhanced reality device 105 to cause display of the reverse video content output stream. In one or more instances, the content processing output platform 103 may send the reverse video content output stream and the one or more commands directing the second enhanced reality device 105 to cause display of the reverse video content output stream to the second enhanced reality device 105 via the communication interface 113 and while the second wireless data connection is established.

At step 229, the second enhanced reality device 105 may receive the reverse video content output stream and the one or more commands directing the second enhanced reality device 105 to cause display of the reverse video content output stream. In one or more instances, the second enhanced reality device 105 may receive the reverse video content output stream and the one or more commands directing the second enhanced reality device 105 to cause display of the reverse video content output stream while the second wireless data connection is established.

Figure 2G:
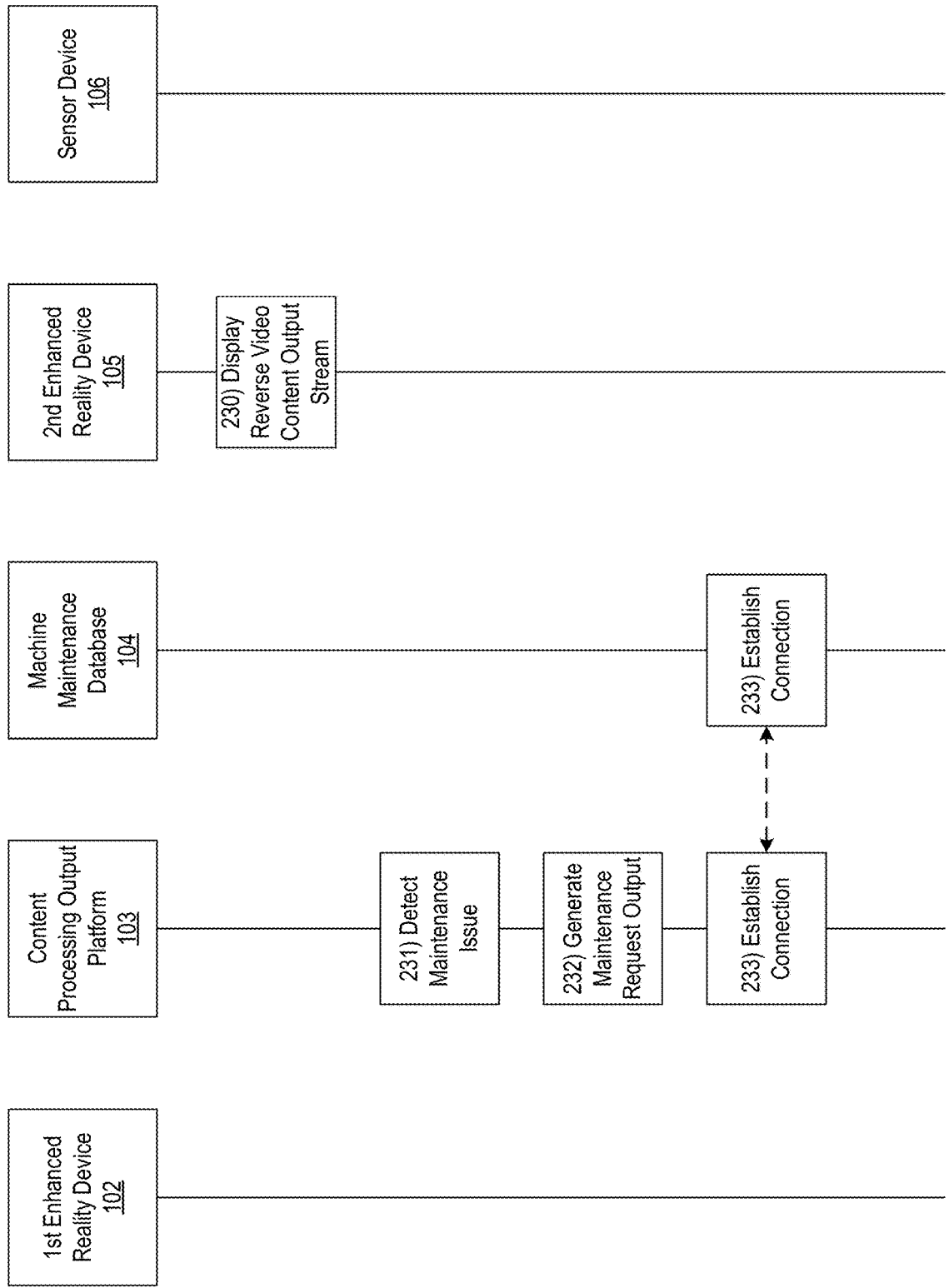
Figure 2I:
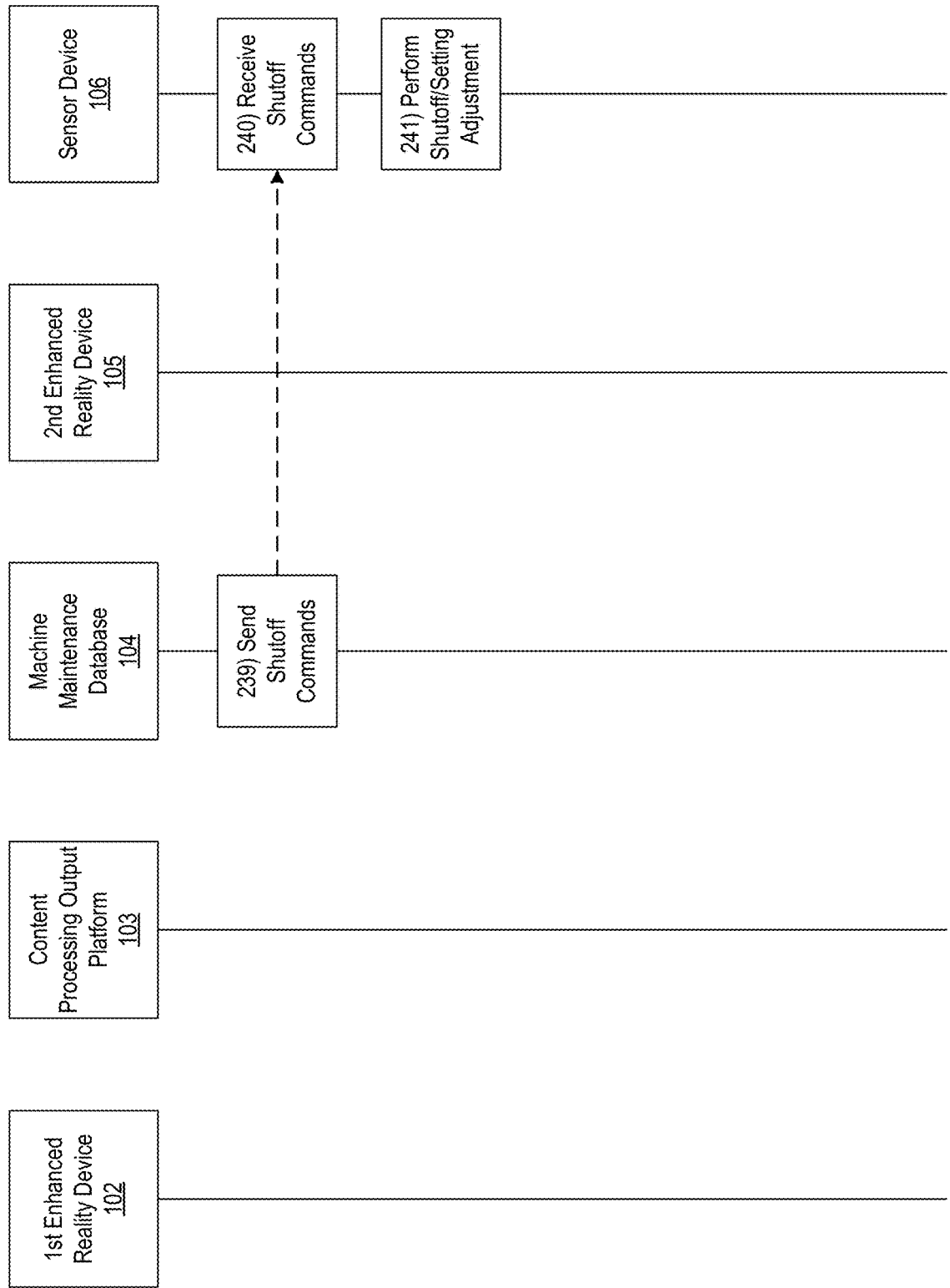

Referring to FIG. 2G, at step 230, the second enhanced reality device 105 may cause display of the reverse video content output stream. In one or more instances, the second enhanced reality device 105 may cause display of a video stream similar to video stream 310 shown in FIG. 3. For example, the second enhanced reality device 105 may cause display of video segments that correspond to assembly and or disassembly of a device, such as the sensor device 106. The second enhanced reality device 105 may cause display of a first video segment corresponding to a first step in disassembly, and may pause before initiating display of a second video segment corresponding to a second step in disassembly. In one or more instances, the second enhanced reality device 105 might not initiate display of a second video segment until receiving a user input indicating the second video segment should be initiated. Additionally or alternatively, a user of the second enhanced reality device 105 may be able to control output of the reverse video content output stream using gesture inputs, voice commands, display inputs, keyboard inputs, mouse inputs, remote control inputs, or the like.

At step 231, the content processing output platform 103 may detect a maintenance issue corresponding to a device using the video content received at step 204. In one or more instances, the content processing output platform 103 may detect the maintenance issue using machine learning and/or object recognition techniques. In one or more instances, in using the machine learning and/or object recognition techniques, the content processing output platform 103 may compare an image of the sensor device 106 to one or more stored images of the sensor device 106. In one or more images, some of the one or more stored images of the sensor device 106 may correspond to various maintenance issues (e.g., corrosion, water damage, excessive wear, or the like). In one or more instances, the content processing output platform 103 may detect the maintenance issue by determining that a correlation between the image of the sensor device 106 and one or more stored images of the sensor device 106 that do not indicate a maintenance issue does not exceed a predetermined threshold. Additionally or alternatively, the content processing output platform 103 may detect the maintenance issue by determining that a correlation between the image of the sensor device 106 and one or more stored images of the sensor device 106 indicating the maintenance issue exceed a predetermined threshold.

In one or more instances, the content processing output platform 103 may detect a maintenance issue with the primary device in the video content (e.g., the device being recorded). Additionally or alternatively, the content processing output platform 103 may detect a maintenance issue with a secondary/background device in the video content (e.g., a different device that may have been peripherally included in the video content). For example, the content processing output platform 103 may perform similar machine learning and/or object recognition techniques as described above. However, in addition to or as an alternative to detecting maintenance issues with the primary device (e.g., sensor device 106), the content processing output platform 103 may detect a maintenance issue with the secondary/background device. For example, the content processing output platform 103 may detect corrosion, water damage, excessive wear, or the like.

At step 232, the content processing output platform 103 may generate a maintenance request output based on the maintenance issue detected at step 231. In one or more instances, in generating the maintenance request output the content processing output platform 103 may generate one or more commands directing a machine maintenance database 104 to update a stored maintenance log (e.g., move a date for service up or down). For example, based on the maintenance issue, the content processing output platform 103 may generate one or more commands to update a regular service date (e.g., 3-months out) to an urgent service date (e.g., today or tomorrow). In one or more instances, the content processing output platform 103 may determine a criticality of the maintenance issue (e.g., using machine learning algorithms) and may generate one or more commands directing the machine maintenance database 104 to update the stored maintenance log accordingly (e.g., request more urgent maintenance for more urgent issues). In one or more instances, the content processing output platform 103 may generate one or more commands directing the sensor device 106 to perform a setting adjustment (e.g., adjust a temperature, pressure, operating capacity, flow rate, or the like) and/or a complete shutdown. In these instances, the content processing output platform 103 may use machine learning analysis to determine what type of commands to send based on the detected maintenance issue. For example, if flooding is detected, the content processing output platform 103 may generate one or more commands directing the sensor device to reduce a flow rate or perform a complete valve shutoff until the flooding is addressed.

At step 233, the content processing output platform 103 may establish a connection to the machine maintenance database 104. In one or more instances, the content processing output platform 103 may establish a third wireless data connection to link the content processing output platform 103 to the machine maintenance database 104. In these instances, the connection may be or might not be a direct connection. In one or more instances, after initially establishing the connection with the machine maintenance database 104, the content processing output platform 103 might not subsequently repeat this step.

Referring to FIG. 2H, at step 234, the content processing output platform may send the maintenance request output generated at step 232 to the machine maintenance database 104. In one or more instances, the content processing output platform 103 may send the maintenance request output via the communication interface 113 and while the third wireless data connection is established.

At step 235, the machine maintenance database 104 may receive the maintenance request output sent at step 234. In one or more instances, the machine maintenance database 104 may receive the maintenance request output while the third wireless data connection is still established.

At step 236, the machine maintenance database 104 may update a stored maintenance log in response to the maintenance request output. For example, the machine maintenance database 104 may update the stored maintenance log to reflect that urgent maintenance should be performed rather than merely the routine maintenance that occurs on a preexisting schedule.

At step 237, the machine maintenance database 104 may generate one or more commands directing the sensor device 106 to perform a setting adjustment (e.g., adjustment to a temperature, flow rate, or the like) and/or a complete shutoff. In one or more embodiments, the one or more setting adjustments commands may be generated in response to the maintenance request output. In one or more instances, the one or more setting adjustment commands may have previously been sent by the content processing output platform 103 at step 232. In these instances, the machine maintenance database 104 might not generate the one or more commands directing the sensor device 106 to perform the setting adjustment and/or complete shutoff. In these instances, steps 237-239 may be performed by the content processing output platform 103 rather than the machine maintenance database 104.

At step 238, the machine maintenance database 104 may establish a connection with the sensor device 106. In one or more instances, the machine maintenance database 104 may establish a fourth wireless data connection with the sensor device 106 to link the machine maintenance database 104 to the sensor device 106. In these instances, the connection may be or might not be a direct connection. In one or more instances, after initially establishing the connection with the sensor device 106, the machine maintenance database 104 might not subsequently repeat this step.

At step 239, the machine maintenance database 104 may send the one or more commands directing the sensor device 106 to perform a setting adjustment and/or a complete shutoff to the sensor device 106. In one or more instances, the machine maintenance database 104 may send the one or more commands directing the sensor device 106 to perform a setting adjustment and/or a complete shutoff while the fourth wireless data connection is still established.

At step 240, the sensor device 106 may receive the one or more commands directing the sensor device 106 to perform a setting adjustment and/or a complete shutoff from the maintenance database. In one or more instances, the sensor device 106 may receive the one or more commands directing the sensor device 106 to perform a setting adjustment and/or a complete shutoff while the fourth wireless data connection is still established.

At step 241, the sensor device 106 may perform a setting adjustment and/or shutoff in response to the one or more commands directing the sensor device 106 to perform a setting adjustment and/or a complete shutoff received at step 240. In one or more instances, in performing the setting adjustment, the sensor device 106 may adjust a temperature, pressure, operating capacity, flow rate, or the like.

Figure 4:
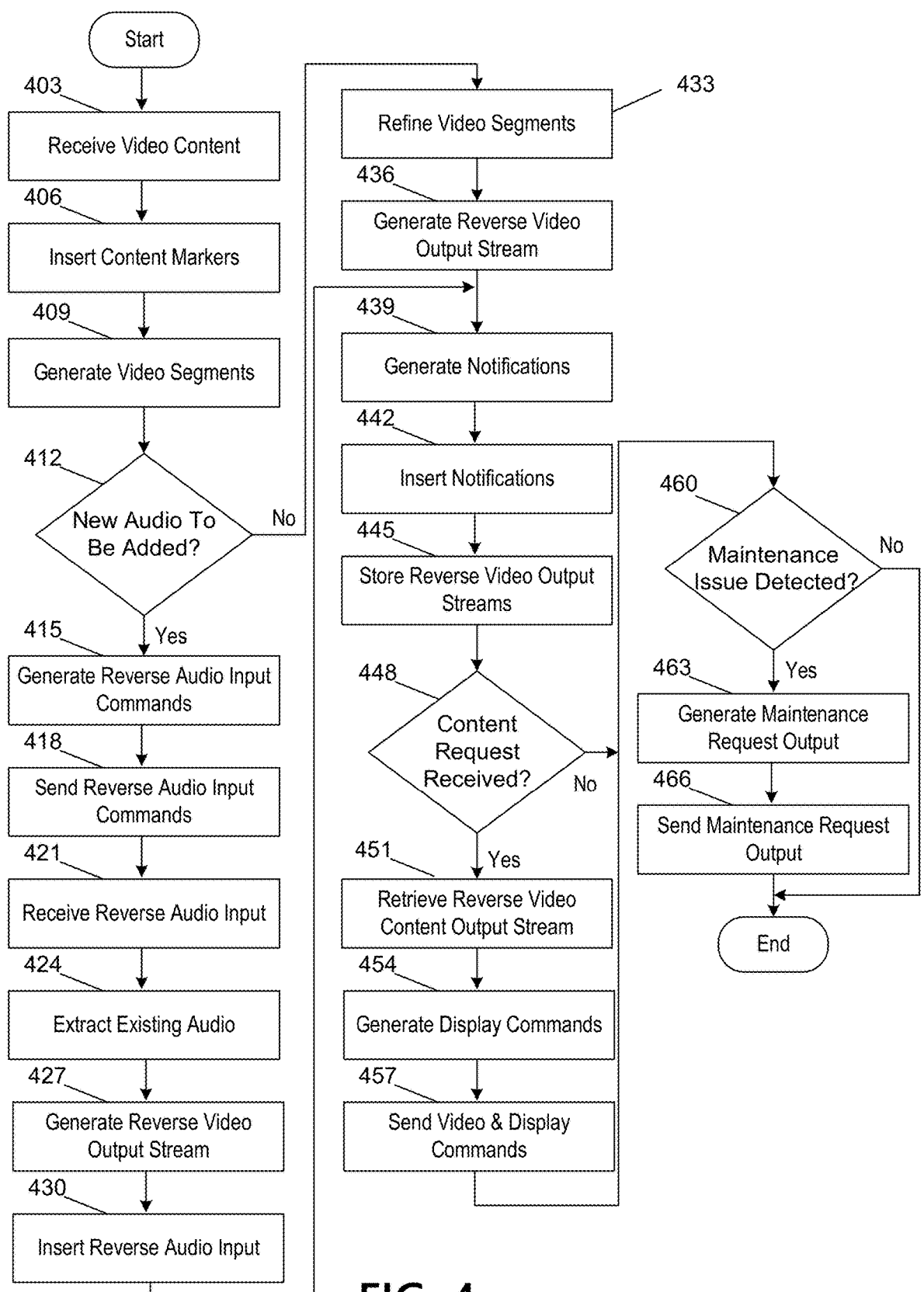
FIG. 4 depicts an illustrative method for deploying a content processing output platform that generates reversible procedure video outputs in accordance with one or more example embodiments.

FIG. 4 depicts an illustrative method for deploying a content processing output platform 103 that performs advanced reversible procedure video output generation in accordance with one or more example embodiments. Referring to FIG. 4, at step 403, a computing platform, having at least one processor, a communication interface, and memory may receive video content. At step 406, the computing platform may determine various steps performed in the video content, and insert markers into the video content to differentiate between the various steps performed in the video content. At step 409, the computing platform may generate video segments based on the content markers. At step 412, the computing platform may determine whether new audio should be added to the video content. In one or more instances, the computing platform may determine whether new audio should be added to the video content based on whether the video content contains speaking. Additionally or alternatively, the computing platform may make this determination based on whether the content processing output platform 103 is reordering the video segments so that the video segment occurring last in the original video content is displayed first and the video segment occurring first in the original video content is displayed last (e.g., the first reverse video output stream generated at step 208) or is generating a reverse playback version of the video content (e.g., the second reverse video output stream generating at step 218). In the former case, the computing platform may determine that audio should not be added. In the latter case, the computing platform may determine that audio should be added. If new audio should not be added, the computing platform may proceed to step 433. If new audio should be added, the computing platform may proceed to step 415.

At step 415, the computing platform may generate one or more commands directing an enhanced reality device to prompt a user to record the new audio. At step 418, the computing platform may send the one or more commands directing the enhanced reality device to prompt the user to record the new audio. At step 421, the computing platform may receive a reverse audio input. At step 424, the computing platform may extract the existing audio from the video content. At step 427, the computing platform may generate a first reverse video output stream using the video segments. At step 430, the computing platform may insert the reverse audio input into the reverse video output stream. In one or more instances, the computing platform might not insert the reverse audio input into the reverse video output stream if the audio corresponding to the reverse video output stream does not contain speaking. Rather, the computing platform may leave the audio corresponding to the reverse video output stream. In one or more instances, if the audio corresponding to the reverse video output stream does contain speaking, the computing platform may filter out the speaking and insert the reverse audio input. In these instances, audio corresponding to a hammer strike, screw turn, or other environmental sounds may still line up. In these instances, the computing platform may break up the audio into segments that may or might not correspond to breaks in the reverse video output stream, and may overlay the non-reversed audio segment over the reverse video output stream. Accordingly, the audio may be played in a reverse order overall (e.g., the audio for step three may be played before step two, which may be played before step one), but the spoken portion of each audio segment may be played back the same way it is recorded thus making the speaking comprehensible.

At step 433, the computing platform may refine the audio and/or video quality of the video segments. In refining the video segments, the content processing output platform 103 may improve the quality of the video or audio segments for playback during the reconstruction process. For example, video may be enhanced (e.g., the content processing output platform 103 may adjust a brightness, a contrast, a sharpness, a color, a stability, or the like) in order to improve the video quality. Thus, by improving the quality of the video or audio segments, a user watching a segment corresponding to a first step of the reconstruction process might not be distracted by a seemingly irrelevant voice command and/or poor video quality caused by a head gesture intended to indicate a step completion input (e.g., because the first enhanced reality device may be mounted on the users head thus head movements may impact video recordation).

At step 436, the computing platform may generate a second reverse video output stream using the refined video segments. It should be understood that in one or more instances, the computing platform may generate both the first reverse video output stream and the second reverse video output stream. At step 439, the computing platform may generate notifications for the reverse video output streams. At step 442, the computing platform may insert the notifications into the reverse video output streams. At step 445, the computing platform may store the reverse video output streams. At step 448, the computing platform may determine whether a request for a reverse video output stream was received. If a request for a reverse video output stream was not received, the computing platform may proceed to step 460. If a request for a reverse video output stream was received, the computing platform may proceed to step 451.

At step 451, the computing platform may retrieve the requested reverse video output stream. At step 454, the computing platform may generate one or more commands directing an enhanced reality device to cause display of the reverse video content output stream. At step 457, the computing platform may send the reverse video content output stream and the one or more commands directing the enhanced reality device to cause display of the reverse video content output stream. At step 460, the computing platform may determine whether any maintenance issues were detected in the video content. If no maintenance issues were determined, the computing platform may proceed to step 466. If a maintenance issue was determined, the computing platform may proceed to step 463.

At step 463, the computing platform may generate a maintenance request output. At step 466, the computing platform may send the maintenance request output to a maintenance database and/or sensor device. In one or more instances, in sending the maintenance request output, the computing platform may cause the sensor device to perform a setting adjustment (e.g., adjust a temperature, pressure, operating capacity, flow rate, or the like).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer- readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor;
    a communication interface commutatively coupled to the at least one processor; and
    memory storing computer-readable instructions that, when executed by the at least one processor, cause the computing platform to:
        receive, from a first enhanced reality device, video content including one or more step completion inputs;
        mark, based on the one or more step completion inputs, data packets in the video content;
        generate, based on the marked data packets, video segments;
        refine the video segments to remove the one or more step completion inputs from the video segments;
        generate, using the refined video segments, a first reverse video content output stream, wherein generating the first reverse video content output stream comprises reversing an order of the refined video segments;
        send, to a second enhanced reality device, the first reverse video content output stream;
        determine, using machine learning analysis and based on the video content, a maintenance update corresponding to a sensor device shown in the video content;
        generate one or more commands directing a maintenance database to update a stored maintenance log and to cause the sensor device to perform a setting adjustment based on the maintenance update; and
        send, to the maintenance database, the one or more commands directing the maintenance database to update the stored maintenance log and to cause the sensor device to perform a setting adjustment.

2. The computing platform of claim 1, wherein the computer-readable instructions, when executed by the at least one processor, cause the computing platform to:
    establish, with a first enhanced reality device, a first wireless data connection;
    establish, with a second enhanced reality device, a second wireless data connection; and
    establish with a maintenance database, a third wireless data connection.

3. The computing platform of claim 1, wherein the computer-readable instructions, when executed by the at least one processor, cause the computing platform to:
    determine an end of a step performed in the video content based on the one or more step completion inputs, wherein the one or more step completion inputs comprise one of: voice commands, hand gestures, head gestures, or touch inputs detected by the first enhanced reality device.

4. The computing platform of claim 1, wherein the computer-readable instructions, when executed by the at least one processor, cause the computing platform to:
    determine one or more particular steps in a process for deconstructing a sensor device based on each video segment corresponding to a portion of the video content associated with conducting a particular step of the one or more particular steps in the process for deconstructing the sensor device.

5. The computing platform of claim 1, wherein the computer-readable instructions, when executed by the at least one processor, cause the computing platform to:
    detect the one or more step completion inputs using one or more of voice recognition, motion detection, or machine learning analysis.

6. The computing platform of claim 1, wherein the computer-readable instructions, when executed by the at least one processor, cause the computing platform to:
    perform object recognition on the video content;
    perform machine learning analysis on the video content;
    generate safety notifications based on results of the object recognition and the machine learning analysis; and
    modify the first reverse video content output stream to include the safety notifications based on the results of the object recognition and the machine learning analysis.

7. The computing platform of claim 1, wherein the computer-readable instructions, when executed by the at least one processor, cause the computing platform to:
    store the first reverse video content output stream.

8. The computing platform of claim 1, wherein the computer-readable instructions, when executed by the at least one processor, cause the computing platform to:
    include video footage of deconstruction of a sensor device in the video content.

9. The computing platform of claim 8, wherein the computer-readable instructions, when executed by the at least one processor, cause the computing platform to:
    receive a content request input from the second enhanced reality device, the content request input comprising a request for instructional video content corresponding to assembly of the sensor device.

10. A method comprising:
    at a computing platform comprising at least one processor, a communication interface, and memory:
        receiving, from a first enhanced reality device, video content including one or more step completion inputs;
        marking, based on the one or more step completion inputs, data packets in the video content;
        generating, based on the marked data packets, video segments;
        refining the video segments to remove the one or more step completion inputs from the video segments;
        generating, using the refined video segments, a first reverse video content output stream, wherein generating the first reverse video content output stream comprises reversing an order of the refined video segments;
        sending, to a second enhanced reality device, the first reverse video content output stream;

determining, using machine learning analysis and based on the video content, a maintenance update corresponding to a sensor device shown in the video content;

generating one or more commands directing a maintenance database to update a stored maintenance log and to cause the sensor device to perform a setting adjustment based on the maintenance update; and sending, to the maintenance database, the one or more commands directing the maintenance database to update the stored maintenance log and to cause the sensor device to perform a setting adjustment.

11. The method of claim 10, further comprising:
generating one or more commands directing the second enhanced reality device to cause display of the first reverse video content output stream; and
sending, to the second enhanced reality device, the one or more commands directing the second enhanced reality device to cause display of the first reverse video content output stream.

12. The method of claim 10, further comprising:
determining a geolocation of the second enhanced reality device; and
selecting, based on the geolocation of the second enhanced reality device, the first reverse video content output stream.

13. The method of claim 10, wherein the setting adjustment comprises an adjustment to a temperature, pressure, or flow rate of the sensor device.

14. The method of claim 10, further comprising:
determining that a second reverse video content output stream should be generated, wherein the second reverse video content output stream comprises the video content streaming in a reverse playback mode.

15. The method of claim 14, further comprising:
generating one or more commands directing the first enhanced reality device to cause display of a reverse audio input interface that prompts a user of the first enhanced reality device to record a reverse audio input;
sending, to the first enhanced reality device, the one or more commands directing the first enhanced reality device to cause display of a reverse audio input interface that prompts a user of the first enhanced reality device to record a reverse audio input; and
receiving the reverse audio input.

16. The method of claim 15, wherein the reverse audio input interface includes the video content streaming in a reverse playback mode.

17. The method of claim 15, wherein the reverse audio input is audio corresponding to a reconstruction process of the sensor device and is an audio overlay for the video content playing in a reverse playback mode.

18. The method of claim 15, further comprising:
extracting existing audio from the video segments; and
inserting the reverse audio input into the video segments.

19. The method of claim 18, further comprising:
generating, after extracting the existing audio from the video segments, the second reverse video content output stream, wherein the second reverse video content output stream corresponds to the video content playing in a reverse playback mode; and
storing, after inserting the reverse audio input into the video segments, the second reverse video content output stream.

20. One or more non-transitory computer-readable media storing instructions that, when executed by a computing platform comprising at least one processor, a communication interface, and memory, cause the computing platform to:
receive, from a first enhanced reality device, video content including one or more step completion inputs;
mark, based on the one or more step completion inputs, data packets in the video content;
generate, based on the marked data packets, video segments;
refine the video segments to remove the one or more step completion inputs from the video segments;
generate, using the refined video segments, a first reverse video content output stream, wherein generating the first reverse video content output stream comprises reversing an order of the refined video segments;
send, to a second enhanced reality device, the first reverse video content output stream;
determine, using machine learning analysis and based on the video content, a maintenance update corresponding to a sensor device shown in the video content;
generate one or more commands directing a maintenance database to update a stored maintenance log and to cause the sensor device to perform a setting adjustment based on the maintenance update; and
send, to the maintenance database, the one or more commands directing the maintenance database to update the stored maintenance log and to cause the sensor device to perform a setting adjustment.

* * * * *